United States Patent
Shirota et al.

[11] Patent Number: 6,063,174
[45] Date of Patent: May 16, 2000

[54] INK FOR USE IN INK-JET RECORDING, COLOR FILTER, LIQUID CRYSTAL PANEL, COMPUTER AND METHOD FOR PRODUCING COLOR FILTER

[75] Inventors: Katsuhiro Shirota, Kawasaki; Takeshi Miyazaki, Ebina; Akio Kashiwazaki, Yokohama; Koichiro Nakazawa; Masashi Hirose, both of Tokyo, all of Japan

[73] Assignee: Canon Kabushiki Kaisha, Tokyo, Japan

[21] Appl. No.: 09/153,459

[22] Filed: Sep. 15, 1998

[30] Foreign Application Priority Data

Sep. 22, 1997 [JP] Japan ..................... 9-255861

[51] Int. Cl.$^7$ ............... C09D 11/02; G02B 5/20
[52] U.S. Cl. ................. 106/31.27; 106/31.49; 106/31.5; 430/7
[58] Field of Search .............. 106/31.27, 31.49, 106/31.5; 430/7; 540/124, 125

[56] References Cited

U.S. PATENT DOCUMENTS

| | | | |
|---|---|---|---|
| 4,086,223 | 4/1978 | Steiner et al. | 106/31.5 |
| 4,446,470 | 5/1984 | Sugiyama et al. | 106/31.49 |
| 4,864,324 | 9/1989 | Shirota et al. | 346/1.1 |
| 5,123,960 | 6/1992 | Shirota et al. | 106/31.49 |
| 5,282,894 | 2/1994 | Albert et al. | 106/31.49 |
| 5,968,688 | 10/1999 | Masuda et al. | 430/7 |

FOREIGN PATENT DOCUMENTS

| | | |
|---|---|---|
| 59-75205 | 4/1984 | Japan . |
| 63-235901 | 9/1988 | Japan . |
| 1-217302 | 8/1989 | Japan . |
| 4-123005 | 4/1992 | Japan . |

OTHER PUBLICATIONS

"Color Science Handbook", New Edition, edited by the Color Science Association of Japan (Sep. 10, 1985), pp. 94–101, with excerpt English Translation.

*Primary Examiner*—Helene Klemanski
*Attorney, Agent, or Firm*—Fitzpatrick, Cella, Harper & Scinto

[57] ABSTRACT

A color filter having a wide color reproducing range and provided with green pixels having a high permeability. The color filter is provided with green pixels containing a water soluble dye A having the x- and y-chromaticity characteristics in the CIE chromaticity diagram as described below and a water soluble dye B having the spectroscopic characteristics as described below:

Water soluble dye A: x-chromaticity is 0.190 to 0.280 when the y-chromaticity is 0.520 in a phosphate buffer solution comprising 60 mM/liter of $Na_2HPO_4 \cdot 12H_2O$ and 16 mM/liter of $KH_2PO_4$ at pH 7.5; and Water soluble dye B: Transmittance of light having a wavelength of 530 nm is 95% or more and transmittance of light having a wavelength of 450 nm is 50% or less in a phosphate buffer solution comprising 60 mM/liter of $Na_2HPO_4 \cdot 12H_2O$ and 16 mM/liter of $KH_2PO_4$ at pH 7.5.

32 Claims, 8 Drawing Sheets

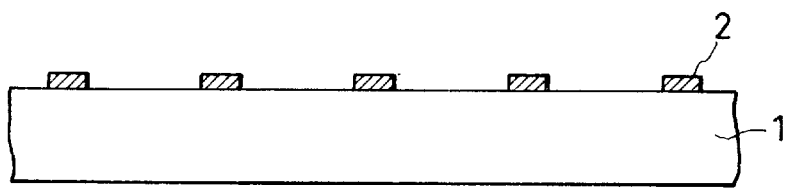
FIG. IA
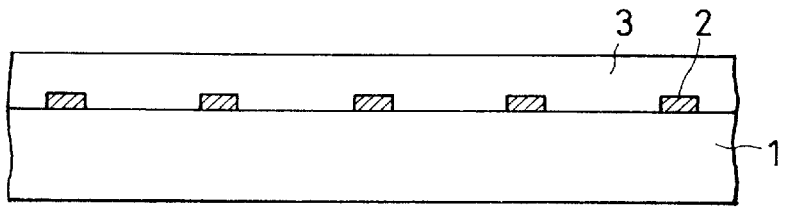
FIG. IB
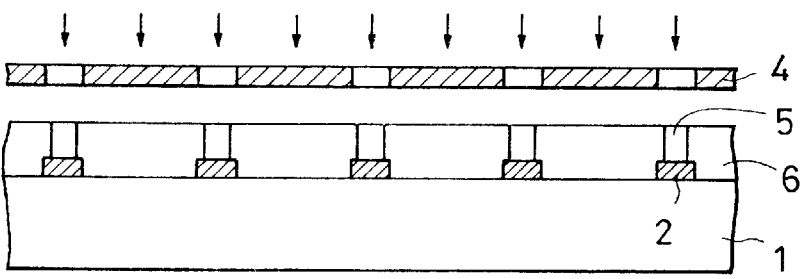
FIG. IC
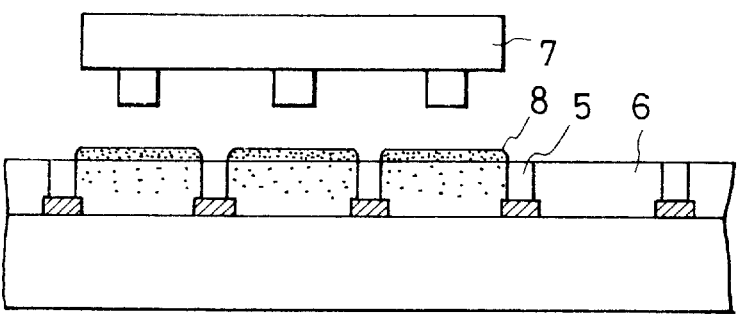
FIG. ID
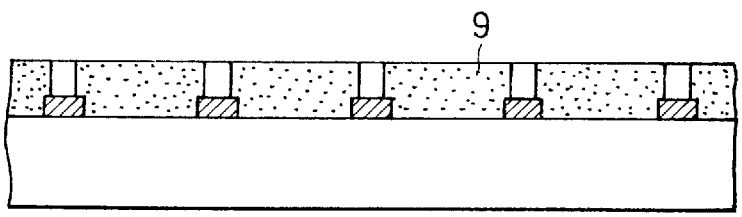
FIG. IE
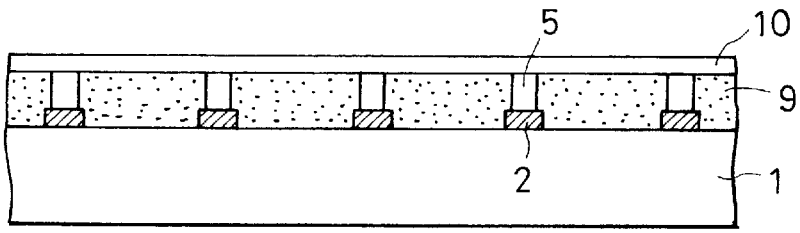
FIG. IF

INK FOR USE IN INK-JET RECORDING, COLOR FILTER, LIQUID CRYSTAL PANEL, COMPUTER AND METHOD FOR PRODUCING COLOR FILTER

BACKGROUND OF THE INVENTION

1. Field of the Invention

The present invention relates to an ink for use in ink-jet recording that can be applied for producing color filters provided with at least green pixels, a color filter, a liquid crystal panel and a computer, and a method for producing the color filter.

2. Related Art

Color filter substrates are important elements of color liquid crystal displays having many colored portions comprising, for example, the three primary colors of R (red), G (green) and B (blue), which are aligned on a substrate with a given pattern.

With the recent development of personal computers, especially of portable personal computers, demands on liquid crystal displays, especially demands on color liquid crystal displays, are increasing. Moreover, it will be necessary to satisfy the two competing demands of reducing the production cost of the display unit on the one hand while providing displays with finer and better image qualities on the other hand. Especially, the demands for color filters relating to production cost are rapidly increasing.

Although a variety of methods have been attempted to comply with the foregoing demands while satisfying the required characteristics of the color filter, no method that can satisfy all the required characteristics has been established yet.

Representative methods for producing color filters will be described below.

The first, most popular, method is a dyeing method. In the dyeing method, a composition prepared by adding photosensitive agents to a water soluble polymer material having affinity for dyeing is used. After forming a receptor layer by patterning the composition into a desired configuration on a substrate by a lithographic process, the receptor layer is immersed in a dyeing bath to obtain a colored portion. This process is repeated three times, thereby obtaining a color filter for the three colors of R, G and B.

The second frequently used method is a pigment dispersion method, which is currently replacing the dyeing method. In this method, a photosensitive resin layer in which pigments are dispersed is at first formed on the substrate and a monochromatic pattern is obtained by patterning the photosensitive resin layer. This process is repeated three times, thereby obtaining a color filter for the three colors of R, G and B.

The third method is a electrodeposition method. In this method, a transparent electrode is patterned on the substrate. Then, the patterned transparent electrode is immersed in an electrodeposition coating solution prepared by dispersing or dissolving pigments, a resin and an electrolyte to subject the electrode to electrodeposition with the first color. This process is repeated three times followed by baking, thereby obtaining a color filter for the three colors of R, G and B.

The fourth method is a printing method. In the printing method, pigments of a heat-curing type resin are dispersed and printing is performed three times followed by heat-curing the resin, thereby obtaining a color filter for the three colors of R, G and B.

A protective layer is usually formed on the colored layer in any of the methods described above.

The common step in these methods is to repeat the same step three times for coloring with the three colors of R, G and B, which naturally increases the production cost. It is also a problem that the more numerous the production steps, the more the production yield decreases.

In addition, the electrodeposition method cannot be applied to the TFT (Thin Film Transistor) type color liquid crystal display with the currently available technology since the configuration of patterns able to be formed by the electrodeposition method is limited. There is a problem in the fourth method—the printing method—that resolution of images and smoothness are poor, making it impossible to form patterns with a fine pitch.

Though there are many methods for producing color filters as described above, the dyeing method using dyes as coloring materials is generally considered to be advantageous when emphasis is put on the coloring ability of the display.

However, in the dying method, it is quite important to find out dyes having not only good color tones, i.e. preferable spectroscopic characteristics, but also superior dyeing abilities in order to effectively stain a dye-receiving layer, and at present, we cannot find out dyes which satisfies with the requirements in high level. Moreover, when one attempts to obtain a desired color tone (toning) by mixing two or more of the dyes, irregular colors are liable to be generated because the different dyes have different dyeing abilities with respect to the receptor layer materials, making it very difficult to control the color tone. This phenomenon becomes especially evident when the structures of the dyes to be mixed are different from each other. When phthalocyanine dyes are used for forming G or B colored portions, for example, it is a problem that other dyes that can be used together with those dyes for toning were severely limited, due to the poor fixing ability of the phthalocyanine dyes. In order to avoid the foregoing problem, it was attempted to generate the green color with one molecular structure by allowing a compound having a mono-azo structure (yellow color component) to combine with a compound having a phthalocyanine frame (cyan color component), thereby obtaining a desired color tone without toning. However, while the problem of color irregularity is minimized with this method since no color toning is required, there is an another problem, namely, that it is difficult to improve transmittance.

In order to improve the fixing ability of the dye to the receptor layer described above, introducing cation groups such as a quaternary ammonium group in the receptor layer is usually attempted when the dye is an anion type dye. However, other problems of change of the color tone of the dye (spectral shift) or deterioration of heat resistance have appeared.

For solving the foregoing problems, a method for producing color filter substrates using an ink-jet method has been proposed (see, for example, Japanese Unexamined Patent publications No. 59-75205, No. 63-235901, No. 1-217302 and No. 4-123005). In contrast to the methods described above, the respective colored portions of R, G and B are formed by one step. These methods comprise, for example, a method for directly attaching a curing type ink containing each of the color materials followed by curing, and a method for coloring the ink receptor layer by directly printing with the coloring inks.

Means for improving fixing ability such as introducing a cation group into the receptor layer are not required in forming colored portions in the ink-jet method described above since a fixing process between the dye and receptor layer as used in the forgoing dyeing method is not needed. Accordingly, it is possible to avoid color tone change (spectral shift) of the dye itself before and after dyeing or a decrease in heat resistance, further eliminating the possibility that the color tone will be very different from the expected color tone, even when an ink containing a plurality of dyes is used for toning.

Colored portions colored with two or more colors can be formed by one step in the ink-jet method, enabling improved productivity and reduced production cost because there is no waste of used ink.

While it is preferable that pixels in the color filter have as high a color reproducibility and light permeability as possible, these two characteristics are often incompatible with each other. For example, although a variety of green dyes or pigments, or dyes in which a yellow dye and a cyan dye are mixed, were investigated and used for green pixels for use in a color filter, there were problems: the light permeability decreased when the coloring concentration of the pixels increased for attaining a high color reproducibility, or the color reproducibility became poor when an emphasis was put on light permeability. Therefore, technical developments for obtaining green pixels in which a high level of compatibility between both color reproducibility and light permeability is realized are urgently desired.

SUMMARY OF THE INVENTION

As a result of investigation for fulfilling these requirements, the inventors of the present invention found that green pixels capable of satisfying the requirements of both color reproducibility and light permeability could be formed by toning dyes having a bluish green color with a large maximum transmittance with a yellow dye, and that the toned color could be ejected from an ink-jet head by the ink-jet method, and that this technique could be advantageously applied to the production of color filters by the ink-jet method, thereby completing the present invention.

Accordingly, one object of the present invention is to provide an ink for use in ink-jet recording that can advantageously be used for forming a color filter having a high level of both color reproducibility and light permeability.

Another object of the present invention is to provide a color filter provided with green pixels wherein both color reproducibility and light permeability are simultaneously attained at a high level.

Another object of the present invention is to provide a liquid crystal panel having excellent color display characteristics.

A further object of the present invention is to provide a computer having an image display device having excellent color display characteristics.

Another object of the present invention is to provide a method for producing color filters in which color reproducibility is compatible with light permeability, both being present at high level, with a low production cost.

The ink for use in ink-jet recording that is suitable for attaining the foregoing objects contains an aqueous medium, a water soluble dye A having the x- and y-chromaticity characteristics in the CIE chromaticity diagram as will be described below, and a water soluble dye B having the spectroscopic characteristics as will be described below:

Water soluble dye A: The x-chromaticity is 0.190 to 0.280 when the y-chromaticity is 0.520 in a phosphate buffer solution comprising 60 mM/liter of $Na_2HPO_4.12H_2O$ and 16 mM/liter of $KH_2PO_4$ at pH 7.5; and Water soluble dye B: Transmittance of light having a wavelength of 530 nm is 95% or more and transmittance of the light having a wavelength of 450 nm is 50% or less in a phosphate buffer solution comprising 60 mM/liter of $Na_2HPO_4.12H_2O$ and 16 mM/liter of $KH_2PO_4$ at pH 7.5.

The color filter that is suitable for attaining the foregoing objects is provided with green pixels forming a pattern on a light permeable substrate. The green pixels contain a water soluble dye A having the x- and y-chromaticity characteristics in the CIE chromaticity diagram as described below and a water soluble dye B having the spectroscopic characteristics as will be described below:

Water soluble dye A: x-chromaticity is 0.190 to 0.280 when the y-chromaticity is 0.520 in a phosphate buffer solution comprising 60 mM/liter of $Na_2HPO_4.12H_2O$ and 16 mM/liter of $KH_2PO_4$ at pH 7.5; and Water soluble dye B: Transmittance of light having a wavelength of 530 nm is 95% or more and transmittance of light having a wavelength of 450 nm is 50% or less in a phosphate buffer solution comprising 60 mM/liter of $Na_2HPO_4.12H_2O$ and 16 mM/liter of $KH_2PO_4$ at pH 7.5.

The liquid crystal panel capable of attaining the foregoing objects has a color filter provided with green pixels forming a pattern on a transparent substrate. The green pixels contain a water soluble dye A having the x- and y-chromaticity characteristics in the CIE chromaticity diagram as will be described below and a water soluble dye B having the spectroscopic characteristics as will be described below, and a panel substrate disposed in an opposing relation to the color filter, a liquid crystal compound being sealed between the color filter and the panel substrate:

Water soluble dye A: x-chromaticity is 0.190 to 0.280 when the y-chromaticity is 0.520 in a phosphate buffer solution comprising 60 mM/liter of $Na_2HPO_4.12H_2O$ and 16 mM/liter of $KH_2PO_4$ at pH 7.5; and Water soluble dye B: Transmittance of light having a wavelength of 530 nm is 95% or more and transmittance of light having a wavelength of 450 nm is 50% or less in a phosphate buffer solution comprising 60 mM/liter of $Na_2HPO_4.12H_2O$ and 16 mM/liter of $KH_2PO_4$ at pH 7.5.

The computer capable of attaining the foregoing objects has an image display device provided with a liquid crystal panel in which a liquid crystal compound is sealed between a color filter and a panel substrate. The color filter is provided with, for example, green pixels forming a pattern on a transparent substrate, the green pixels containing a water-soluble dye A having the x- and y-chromaticity characteristics in the CIE chromaticity diagram as described below and a water-soluble dye B having the spectroscopic characteristics as will be described below.

Water soluble dye A: x-chromaticity is 0.190 to 0.280 when the y-chromaticity is 0.520 in a phosphate buffer solution comprising 60 mM/liter of $Na_2HPO_4.12H_2O$ and 16 mM/liter of $KH_2PO_4$ at pH 7.5; and Water soluble dye B: Transmittance of light having a wavelength of 530 nm is 95% or more and transmittance of light having a wavelength of 450 nm is 50% or less in a phosphate buffer solution comprising 60 mM/liter of $Na_2HPO_4.12H_2O$ and 16 mM/liter of $KH_2PO_4$ at pH 7.5.

The method for producing the color filter capable of attaining the foregoing objects comprises the step of ejecting an ink for use in ink-jet recording containing, for example, a water soluble dye A having the x- and y-chromaticity characteristics in the CIE chromaticity diagram as will be described below, a water soluble dye B having the spectroscopic characteristics as will be described below and an aqueous medium on the transparent substrate using a ink-jet method to adhere the ink to a desired position on the surface of the substrate, thereby forming colored pixels.

Water soluble dye A: x-chromaticity is 0.190 to 0.280 when the y-chromaticity is 0.520 in a phosphate buffer solution comprising 60 mM/liter of $Na_2HPO_4.12H_2O$ and 16 mM/liter of $KH_2PO_4$ at pH 7.5; and Water soluble dye B: Transmittance of light having a wavelength of 530 nm is 95% or more and transmittance of light having a wavelength of 450 nm is 50% or less in a phosphate buffer solution comprising 60 mM/liter of $Na_2HPO_4.12H_2O$ and 16 mM/liter of $KH_2PO_4$ at pH 7.5.

Another method for producing the color filter capable of attaining the foregoing objects comprises the steps of ejecting an ink for use in ink-jet recording containing a water soluble dye A having the x- and y-chromaticity characteristics in the CIE chromaticity diagram as will be described below, a water soluble dye B having the spectroscopic characteristics as will be described below and an aqueous medium on the transparent substrate using a ink-jet method to adhere the ink to a desired position on a surface of the substrate, followed by curing the curable resin in the ink to form colored pixels.

Water soluble dye A: x-chromaticity is 0.190 to 0.280 when the y-chromaticity is 0.520 in a phosphate buffer solution comprising 60 mM/liter of $Na_2HPO_4.12H_2O$ and 16 mM/liter of $KH_2PO_4$ at pH 7.5; and Water soluble dye B: Transmittance of light having a wavelength of 530 nm is 95% or more and transmittance of light having a wavelength of 450 nm is 50% or less in a phosphate buffer solution comprising 60 mM/liter of $Na_2HPO_4.12H_2O$ and 16 mM/liter of $KH_2PO_4$ at pH 7.5.

According to the present invention, a color filter provided with green pixels in which the two opposing characteristics of color reproducibility and light permeability are made to be compatible with each other can be obtained, thus making it possible to obtain a liquid crystal panel that is excellent in color display characteristics.

BRIEF DESCRIPTION OF THE DRAWINGS

FIGS. 1A through 1F are a process flow diagram of one embodiment for producing the color filter according to the present invention.

DETAILED DESCRIPTION OF THE PREFERRED EMBODIMENTS

Figure 2:
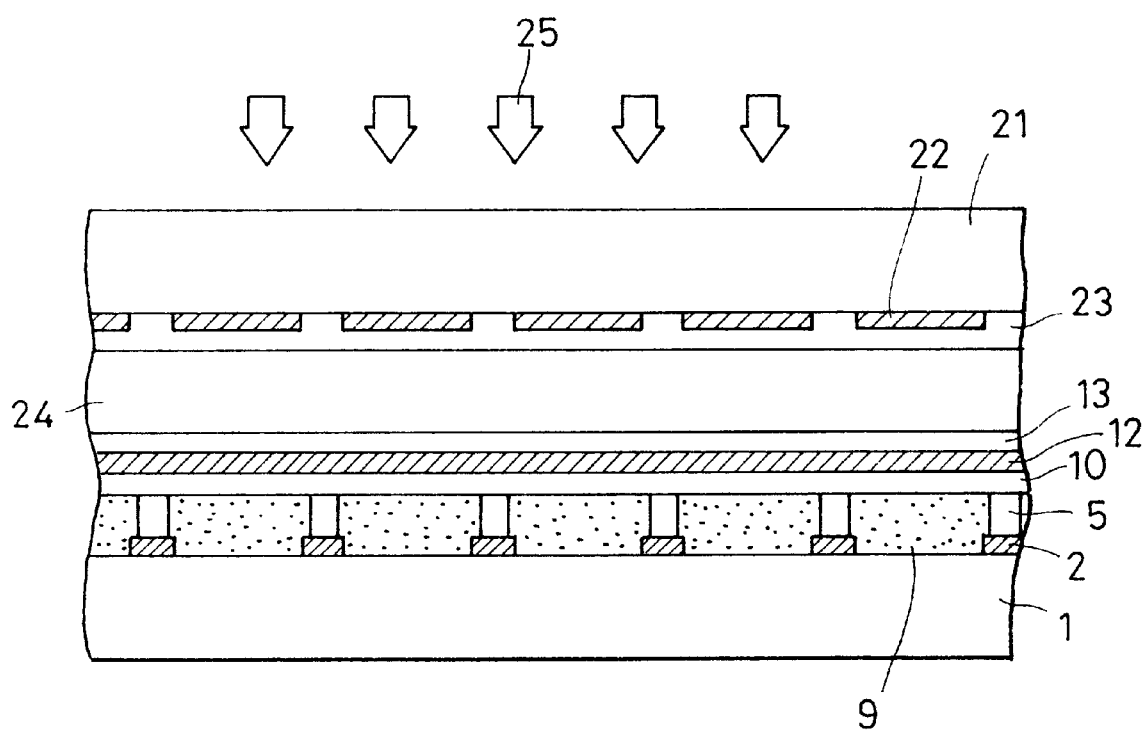
FIG. 2 is an illustrative cross section of one embodiment of a liquid crystal panel in which the color filter formed in FIGS. 1A through 1F is assembled.
Figure 3A:
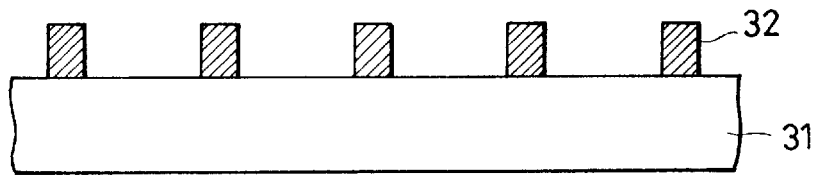
FIGS. 3A through 3D are a process flow diagram of another embodiment for producing the color filter according to the present invention.
Figure 3B:
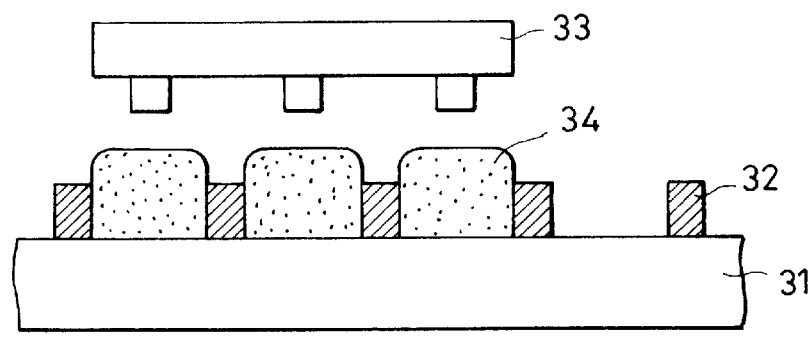
Figure 3C:
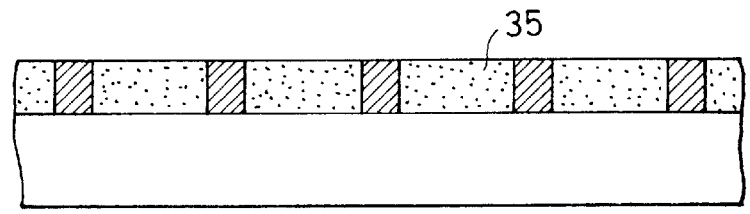
Figure 3D:
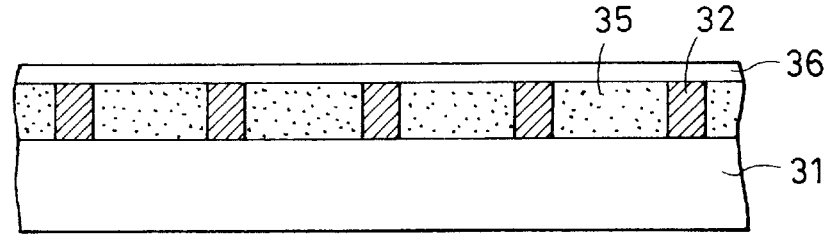

It is preferable that the ink for use in ink-jet recording contains a water soluble dye A having the x- and y-chromaticity characteristic in the CIE chromaticity diagram as will be described below, a water soluble dye B having the spectroscopic characteristics as will be described below and an aqueous medium.

Water soluble dye A: x-chromaticity is 0.190 to 0.280 when the y-chromaticity is 0.520 in a phosphate buffer solution comprising 60 mM/liter of $Na_2HPO_4.12H_2O$ and 16 mM/liter of $KH_2PO_4$ at pH 7.5; and Water soluble dye B: Transmittance of light having a wavelength of 530 nm is 95% or more and transmittance of light having a wavelength of 450 nm is 50% or less in a phosphate buffer solution comprising 60 mM/liter of $Na_2HPO_4.12H_2O$ and 16 mM/liter of $KH_2PO_4$ at pH 7.5.

A considerable amount of the yellow light permeates the water soluble dye A. This dye itself has a bluish green color and, while it is not suitable for reproducing the green color when it is used alone, the stimulus value Y (corresponding to brightness of the color) obtained on the basis of the XYZ color specification system (JIS Z8701) is high as compared with most of the dyes known in the art as dyes for use in green pixels. Now, the XYZ color specification system (JIS Z8701) corresponds to CIE 1964 supplementary standard calorimetric system. Detailed description of the system is explained on pages 94–101 of "SHIKISAI KAGAKU HANDOBUKKU (Handbook of science of color)" edited by Japanese Society of Science of Color, published on Sep. 10, 1985. Therefore, the ink according to the present invention is made suitable for producing a color filter provided with high quality green pixels in which a high level of color reproducibility is made compatible with high light permeability. This is accomplished by allowing a water soluble dye, namely, water soluble dye B, which increases yellow light absorption without diminishing the brightness of the water soluble dye A, to exist in the ink together with the water soluble dye A. To form pixels with a high light permeability, it is preferable to select a water soluble dye A having a stimulus value Y (corresponding to brightness of the color) obtained on the basis of the XYZ color specification system (JIS Z8701) of 45 or more, wherein x-chromaticity is 0.190 to 0.280 when y-chromaticity is 0.520 in a phosphate buffer solution comprising 60 mM/liter of $Na_2HPO_4.12H_2O$ and 16 mM/liter of $KH_2PO_4$ at pH 7.5.

A dye having the x-value of more than 0.280 when the y-value in the CIE chromaticity diagram is 0.520 has a low stimulus value Y, and is only a little better than a dye giving conventional green pixels. When the x-value is smaller than 0.190, on the other hand, the amount of the water soluble dye B to be added for toning must be increased. This is not preferable, since the ink's suitability for ink-jet recording becomes inferior. Accordingly, it can be concluded that the x-value as described above should be within the preferable range. Thus, the ink according to the present embodiment provides excellent pixels along with maintaining suitability for ink-jet recording.

Example of Water Soluble Dye A

The water soluble dye A can be obtained by introducing, for example, a light absorbing structure (for example a mono-azo structure) into a phthalocyanine frame. The following two points should be kept in mind:

1. The structure of the yellow component to be bound to the phthalocyanine frame; and
2. The molar ratio of the yellow component to the phthalocyanine frame portion.

In case that a molecular structure absorbing reddish yellow color, i.e. a structure having a high $\lambda_{max}$, is employed as the yellow component, the dye itself assumes a green color along with decreasing the brightness. The same result is obtained when the proportion of the yellow component in the dye molecule is high.

The phthalocyanine dye represented by the following general formula (I) may be advantageously used as the water soluble dye A according to the present invention:

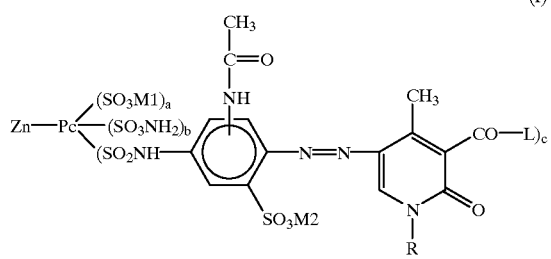

(I)

wherein Zn—Pc represents a zinc phthalocyanine frame; R represents a linear or branched alkyl group with 1 to 6 carbons; L represents OH or $NH_2$; M1 and M2 independently represent a mono-valent alkali metal (such as Na or K); a=1 or 2; b=0, 1 or 2; c=1 or 2 and a+b+c≦4.

Example of Water Soluble Dye B

Water soluble dye B may be appropriately selected from among existing dyes, examples of them being listed in TABLE 1 below.

TABLE 1

| No. | Name of dye | Transmittance at 450 nm when transmittance at 530 nm is 95% |
|---|---|---|
| 1 | C.I. Acid Yellow 1 | 0 |
| 2 | C.I. Acid Yellow 11 | 0 |
| 3 | C.I. Acid Yellow 17 | 0 |
| 4 | C.I. Acid Yellow 19 | 0 |
| 5 | C.I. Acid Yellow 23 | 0 |
| 6 | C.I. Acid Yellow 44 | 0 |
| 7 | C.I. Acid Yellow 104 | 19 |
| 8 | C.I. Acid Yellow 110 | 7 |
| 9 | C.I. Acid Yellow 127 | 1 |
| 10 | C.I. Acid Yellow 141 | 2 |
| 11 | C.I. Acid Yellow 169 | 24 |
| 12 | C.I. Acid Yellow 176 | 11 |
| 13 | C.I. Acid Yellow 184 | 0 |
| 14 | C.I. Acid Yellow 235 | 37 |
| 15 | C.I. Acid Yellow 246 | 32 |
| 16 | C.I. Direct Yellow 9 | 0 |
| 17 | C.I. Direct Yellow 10 | 0 |
| 18 | C.I. Direct Yellow 12 | 31 |
| 19 | C.I. Direct Yellow 39 | 2 |
| 20 | C.I. Direct Yellow 50 | 38 |
| 21 | C.I. Direct Yellow 58 | 34 |
| 22 | C.I. Direct Yellow 84 | 21 |
| 23 | C.I. Direct Yellow 87 | 0 |
| 24 | C.I. Direct Yellow 90 | 12 |
| 25 | C.I. Direct Yellow 98 | 26 |
| 26 | C.I. Direct Yellow 137 | 0 |
| 27 | C.I. Direct Yellow 144 | 7 |
| 28 | C.I. Direct Yellow 147 | 0 |
| 29 | C.I. Reactive Yellow 1 | 0 |
| 30 | C.I. Reactive Yellow 2 | 0 |
| 31 | C.I. Reactive Yellow 18 | 0 |
| 32 | C.I. Reactive Yellow 49 | 0 |
| 33 | C.I. Reactive Yellow 79 | 0 |
| 37 | C.I. Reactive Yellow 81 | 2 |
| 35 | C.I. Reactive Yellow 99 | 45 |

TABLE 1-continued

| No. | Name of dye | Transmittance at 450 nm when transmittance at 530 nm is 95% |
|---|---|---|
| 36 | C.I. Reactive Yellow 135 | 0 |
| 37 | C.I. Reactive Yellow 220 | 38 |

The proportion of water soluble dyes A and B in the ink is adjusted so that the x-value in the CIE chromaticity diagram is as close to 3.10 as possible, preferably within the range that does not decrease the brightness of the water soluble dye A. Although it depends on the combination of water soluble dyes A and B, the color can be desirably toned by preparing the combination of dye A and dye B at a ratio in the range of 5:5 to 8:2.

It is preferable that the concentration of dyes A and B in the ink is a total of 0.5 to 10% by weight relative to the total weight of the ink, the range of 2 to 9% by weight being especially preferable.

Ink Jet Discharge Characteristics of the Ink

While the ink according to the present invention can be quite advantageously used for forming green pixels of the color filter, use of the ink is not limited thereto. For example, it can be used as an ink for use in usual image recording. The ink jet recording method comprises a recording method in which mechanical energy is imparted to the ink to discharge liquid droplets and a recording method in which thermal energy is imparted to the ink to discharge the ink by bubbling.

While it is preferable for an ink to be used in ink-jet recording to have characteristics that enable it to be constantly discharged from the ink-jet head, it is also preferable that the ink liquid have characteristics such as a viscosity of 1 to 15 cpm and a surface tension of 25 dyne/cm or more, especially 1 to 10 cpm for the viscosity and 35 to 60 dyne/cm for the surface tension, from the view point of dischargeability from the ink-jet head. Preferable aqueous media for endowing the ink with the characteristics described above include, for example, at least one of: glycerine, trimethylolpropane, thioglycolether, ethylene glycol, diethylene glycol and isopropyl alcohol.

To provide the ink according to the present embodiment with other desirable physical and chemical characteristics, a surface active agent, defoaming agent, antiseptic agent and mildewproof agent as well as commercially available water soluble dyes may be added, if necessary.

A method for producing a color filter substrate according to the present invention will be described hereinafter referring to the drawings. FIGS. 1A through 1F are a process flow diagram of one embodiment of the method for producing the color filter substrate according to the present invention. FIGS. 1A through 1F are the illustrative cross sections corresponding to the following steps a to f.

Step a

A black matrix 2 is formed on the substrate 1 if necessary. While a glass plate is usually used for the substrate 1, a plastic plate may be used provided that it does not compromise the transparency of the color filter and has the required characteristics—such as strength—depending on the field of application of the color filter. A substrate on which an opaque member such as a metal reflection layer is formed may be used for the substrate in constructing reflection type liquid crystal elements. The film thickness of the black matrix 2 is usually 0.1 to 0.5 μm when the color filter substrate is used for a liquid crystal element, the film being formed into a given pattern after forming the film by sputtering or deposition of a metal such as chromium on the substrate 1.

Step b

An ink receptor layer 3 is then formed on the substrate 1 using a curing type resin composition. The preferable curing type resin composition for forming the ink receptor layer 3 in the present invention is a type curable by light irradiation or by light irradiation and heat treatment. The resin composition can extinguish or express its ink absorbing property by curing when the ink receptor layer is subjected to step e to be described hereinafter.

Actually, a polymer of a water soluble acrylic monomer alone having at least the structural unit shown in the general formula (VI) below, or a polymer containing a copolymer of the above monomer and other vinyl monomers, is used for the ink receptor layer. When the step e is applied, it is preferable that the polymer is used by combining it with a photochemical polymerization initiator.

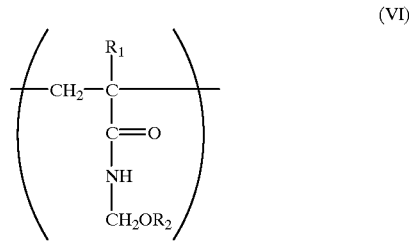

In the formula above, $R_1$, represents H or $CH_3$, and $R_2$ represents H or an alkyl group that may be substituted.

Examples of the monomer corresponding to the structural unit shown in formula (VI) are N-methylol acrylamide, N-methoxymethyl acrylamide, N-ethoxydimethyl acrylamide, N-isopropoxymethyl acrylamide, N-methylol methacrylamide, N-methoxymethyl methacrylamide and N-ethoxymethyl methacrylamide, but they are not limited thereto.

Examples of other vinyl monomers as described above include acrylic acid; methacrylic acid; acrylic acid esters such as methyl acrylate and ethyl acrylate; methacrylic acid esters such as methyl methacrylate and ethyl methacrylate; vinyl monomers containing hydroxy groups such as hydroxymethyl methacrylate, hydroxyethyl methacrylate, hydroxymethyl acrylate and hydroxyethyl acrylate; styrene; α-methylstyrene; acrylamide; methacrylamide; acrylonitrile; allylamine: vinylamine; vinyl acetate and vinyl propionate, but they are not limited thereto.

It is preferable that the copolymerization ratio between the monomer unit corresponding to the structural unit in general formula (VI) and other vinyl monomers is in the range of 95:5 to 5:95. Other polymer compounds may be mixed with the acrylamide homopolymer and/or copolymer. Such polymer compounds include polyvinyl pyrrolidone, polyvinyl alcohol, polyvinyl acetal, polyurethane, carboxymethyl cellulose, polyester, polyacrylic acid (ester), hydroxyethyl cellulose and hydroxypropyl cellulose, or synthetic resins of these modified compounds, or natural resins such as albumin, gelatin, casein, starch, cationic starch, gum arabic and sodium alginate.

The blending amount of other polymer compounds described above is preferably 70% by weight or less relative to the total quantity of the resin constituting the ink receptor layer.

Onium salts and halogenated triazine compounds, for example, are preferably used as photochemical polymerization initiators. Examples of the onium salts are triphenylsulfonium hexafluoroantimonate, triphenylsulfonium tetrafluoroborate, triphenylsulfonium hexafluorophosphate and triphenylsulfonium trifluoromethylsulfonate, or their derivatives, besides diphenyliodonium hexafluoroantimonate, diphenyliodonium tetrafluoroborate, diphenyliodonium hexafluorophosphate and diphenyliodonium trifluoromethyl-sulfonate, or their additives. While halogenated triazine compounds are advantageous for use among these, they are not limited thereto.

The blending amount of the photochemical polymerization initiators described above is 0.01 to 20% by weight, preferably 0.1 to 10% by weight, relative to the ink receptor layer material described above. Compounds of perylene and anthracene may be added as sensitizers.

Various additives may be added to the curing type resin composition described above, if required. Examples of the additives are various kinds of surface active agents, dye fixing agents (water resistance agents), defoaming agents, antioxidants, fluorescent decoloring agents, ultraviolet light absorbers, dispersing agents, viscosity adjusting agents, pH adjusting agents, mildewproof agents and plasticizers. These additives may be optionally selected from the compounds known in the art, as needed.

The curing type resin composition described above is coated on the substrate by spin coating, bar coating, spray coating and dip coating methods and the coated layer is pre-baked, if necessary, to form an ink receptor layer 3.

The thickness of the ink receptor layer 3 is about 0.3 to 3.0 μm when the color filter substrate according to the present embodiment is used for the liquid crystal element.

Step c

For the purpose of preventing the color of adjoining colored portions from being mixed, it is desirable that the non-colored portion 5 be formed in this step. That is, the ink receptor layer 3 is exposed to light with a pattern to form the non-colored portion 5. When using the type of ink receptor layer in which the ink absorbing property is extinguished by exposure to light, the layer is exposed to light with a pattern inverse to that used for a resin composition of the type that expresses its ink absorbing property by exposure. It is preferable that the ink receptor layer 3 be treated with a component that allows the non-colored portion 5 to express ink-repelling properties so that the inks are not mixed between adjoining colored portions when the colored inks are applied.

While a mask 4 having openings corresponding to the black matrix 2 is used in the foregoing pattern exposure process, it is preferable to use a mask having narrower openings than the width of the black matrix 2 in order to prevent the color filter from being stripped.

The method for irradiating the light is not especially limited, but a deep-UV light is preferably used in the present invention, the light irradiation condition being about 1 to 3000 $mJ/cm^2$. Heat treatment by means of an oven or a hot plate may also be used with the light, if necessary, the sufficient temperature conditions being 50 to 180° C. for 10 seconds to 20 minutes. Unexposed portion 6 is not irradiated.

Step d

Colored inks 8 of R, G and B are applied to the desired site of the unexposed portion 6 of the ink receptor layer from the ink-jet head 7, so that the ink receptor layer comprises pixels of R, G and B. Of the colored inks 8 described above, the ink for use in ink-jet recording according to the present invention as described previously is used as the G ink. The other inks, R and B, are not especially limited; inks known in the art may be appropriately used. It is, however, desirable that these inks have compositions and characteristics as close to those of the G ink as possible in order to make them co-ordinate with the ink-jet printing conditions.

Surface active agents, defoaming agents and mildewproof agents may be added to the colored inks for endowing the inks with desired characteristics.

A bubble jet type printer using an electrical-to-heat energy conversion element or a piezo-jet type printer using a piezo element may be used in the ink-jet method, and the coloring area and coloring pattern can be arbitrarily selected.

Step e

After forming the colored portion 9 by applying the colored inks 8 over the entire unexposed portion 6, the entire ink receptor layer 3 is cured by light irradiation or by a combination of light irradiation and heat treatment.

Step f

Usually, a protective layer 10 is formed on the color filter. A light-curing or heat-curing type resin composition, or a resin composition of a heat and light curing mixed type, or an inorganic film formed by deposition or sputtering may be used for the protective layer 10. Thus, a curable resin layer may be formed, covering the pixels, and the curable resin layer is cured by light, heat or a combination of both. Anyway, a layer having transparency suitable for use in the color filter substrate, along with being durable to the succeeding ITO (Indium Tin Oxide film) forming process and oriented film forming process, may be used.

FIG. 2 shows one embodiment of the TFT color liquid crystal element in which the color filter substrate according to the foregoing embodiment is assembled. In FIG. 2, 12 is a common electrode, 13 is an oriented film, 21 is an opposing substrate, 22 is pixel electrodes, 23 is an oriented film and 24 is a liquid crystal compound. As in FIGS. 1A through 1F, 5 is an unexposed portion and 10 is a protective layer.

The color liquid crystal element is usually formed by placing the color filter substrate opposite the opposing substrate 21 followed by sealing the liquid crystal compound 24. TFT (not shown in the drawing) and the transparent pixel electrodes 22 are formed into a matrix inside of one substrate of the liquid crystal element. Colored portions 9 of the color filter are disposed opposite the pixel electrodes 22 inside of the other substrate 1 so as to align R, G and B colors, the transparent common electrode 12 being formed over the entire surface. The black matrix 2 is usually formed on the color filter substrate side. The oriented films 13 and 23 are further formed on the inner face of both substrates, and the liquid crystal molecules can be aligned along a given direction by subjecting the oriented films to a rubbing treatment. These substrates are disposed in opposing relation with each other via spacers (not shown in the drawing), into the space of which the liquid crystal compound 24 is filled.

The liquid crystal elements, in which a polarizer is adhered outside the respective substrates, described above, can work as a display by using a back light assembled, in general, by combining a fluorescent lamp with a light scattering plate, wherein the liquid crystal compound serves as an optical shutter for changing the transmittance of the light 25 from the back light.

Figure 8:
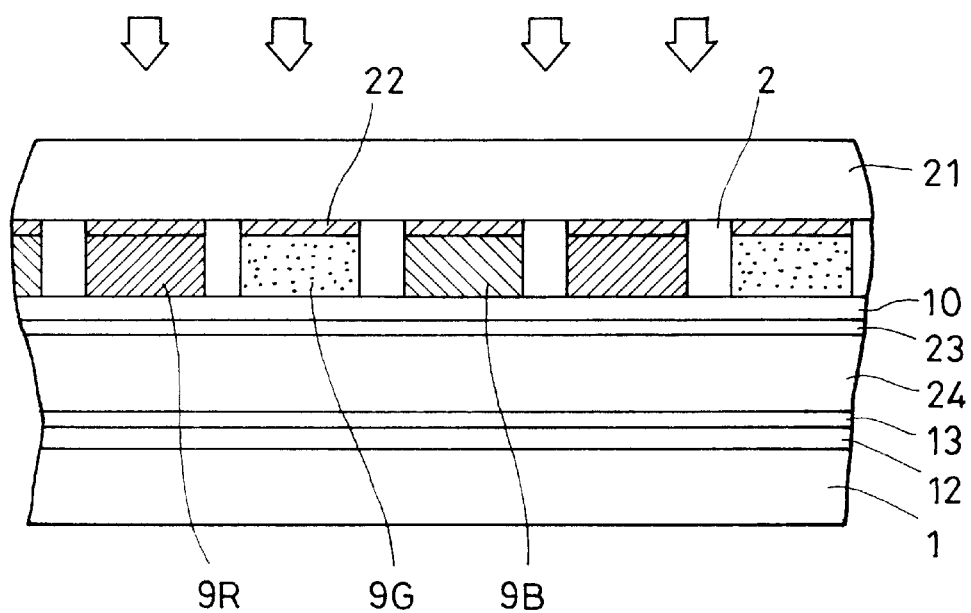
FIG. 8 is an illustrative cross section of a liquid crystal panel according to the yet another embodiment of the present invention.

While the color filter according to the present invention was so constructed as to have the black matrix 2 on the color filter substrate 1 in one embodiment as described in FIGS. 1A through 1F, it may be constructed so that the black matrix is provided on the TFT substrate 21, providing no black matrix on the color filter substrate 1, as shown in FIG. 8. Otherwise, the color filter may be so constructed as to allow each of the color pixels to be disposed on respective pixel electrodes 22 of the TFT substrate, as shown in FIG. 8. The present invention is applicable to any of these embodiments.

Figure 9:
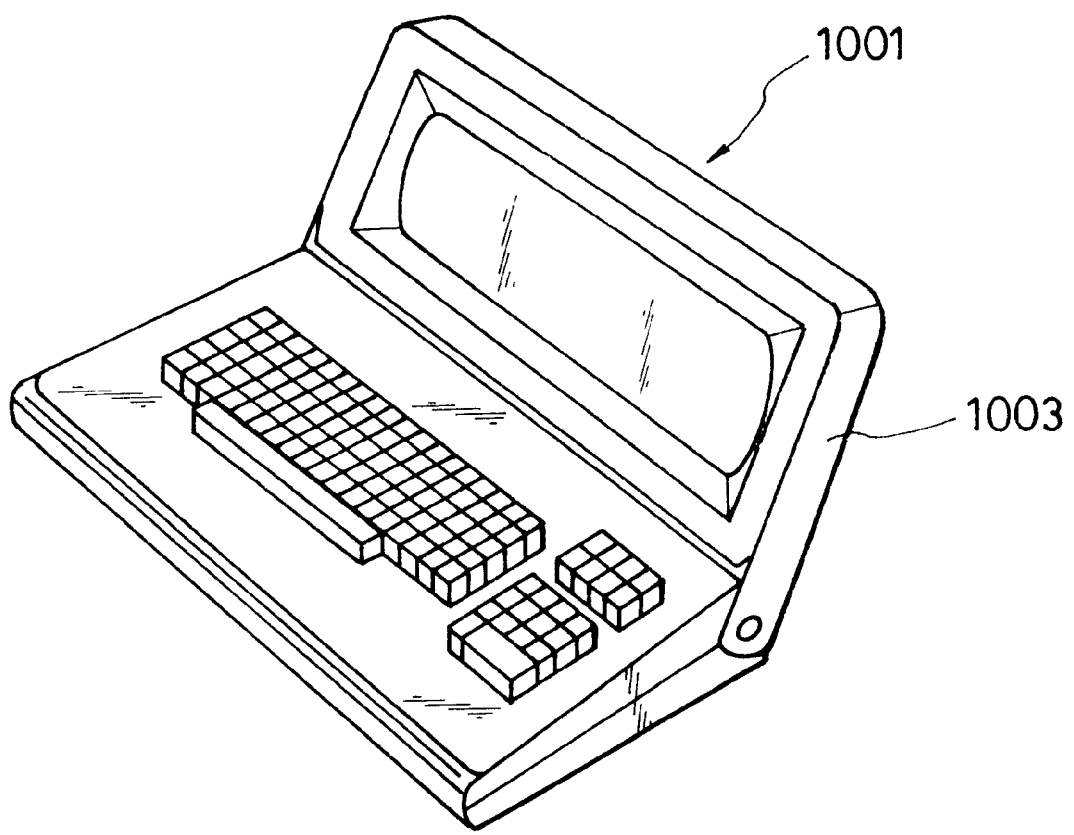
FIG. 9 is a perspective view of the outline of a computer provided with a liquid crystal panel according to the present invention as an image display device.

Liquid crystal panels having the constructions shown in FIG. 2, FIG. 4, FIG. 7 and FIG. 8 can be also used for the image display device 1003 of the computer 1001 shown in FIG. 9.

While the TFT liquid crystal element was described in the foregoing embodiment, the present invention is not limited thereto but can be advantageously applied to liquid crystal elements of different addressing types, such as a passive matrix addressing type.

Other conventional components can be used for the liquid crystal panel according to the present invention provided that the components include the color filter substrate of the present invention.

Likewise, conventionally used liquid crystals such as TN (Twisted Nematic) type liquid crystals and ferroelectric liquid crystals may be used for the liquid crystal compound.

The process flow diagram of the color filter substrate according to the another embodiment of the present invention is shown in FIGS. 3A through 3D. FIGS. 3A through 3D are the illustrative cross sections corresponding to steps a to d, respectively.

Step a

Barriers are formed on the substrate 31. The barriers prevent adjoining pixels of different colors, for example, R, G and B, from being mixed in applying curing type inks to be described hereinafter, and form a black matrix 32 serving also as light shielding layers in the present embodiment. A resist containing a black pigment is preferably used for the black matrix 32 to be subjected to a patterning by the conventional lithographic method. It is preferable that the black matrix be endowed with an ink repelling property, that is, it has a surface that is not stainable, in order to prevent mixing of the different inks with each other when the curing type inks to be described hereinafter are applied. The preferable thickness of the black matrix 32 is 0.5 $\mu$m or more in view of the barrier function and light shielding function as described above.

Step b

The curing type inks 34 of each color of R, G and B are then applied, in their respective patterns, so as to bury the openings of the black matrix 32 using the ink jet head 33. These R, G and B patterns may be formed into a so-called casting pattern. It is preferable that the curing type inks are applied so that respective colored inks are not overlapped on the black matrix 32.

In the curing type inks to be used in the present invention, the G ink is the ink for ink-jet recording according to the present invention as described above. In other words, the ink contains a combination of specified coloring materials A and B. Although the other inks R and B are not especially limited, it is preferable that the compositions and characteristics of these inks be as close to those of the G ink as possible, for the purpose of co-ordinating with the ink-jet printing conditions. The concentrations of the coloring material A and coloring material B in the G ink are adjusted so that the chromaticity of the green filter formed is x=0.310 and y=0.520.

The curing type ink 34 described above contains at least a resin curable by the application of energy. The resins listed in the curing type resin compositions for forming the ink receptor layer 3 in the foregoing embodiments, a combination of the resin and photochemical polymerization initiators or a commercially available negative type resist may be used for these resins.

A variety of solvents may be used for the curing type ink above. A mixed solvent of water and water soluble organic solvents is preferably used to provide desirable discharge characteristics with respect to the ink-jet method.

Surface active agents, defoaming agents and antiseptic agents may be added for the purpose of endowing the components above with desired characteristics, if necessary.

When a photochemically curing compound of the type to be polymerized by a photochemical reaction is used, the coloring material may be a non-solvent type dissolved in the monomer.

Step c

After the drying process, if necessary, the curing type ink is cured by applying the required treatment, such as light irradiation and heat treatment, thereby forming the pixels of the colored portion 35.

Step d

The protective layer 36 is formed on the color filter, if required.

Figure 4:
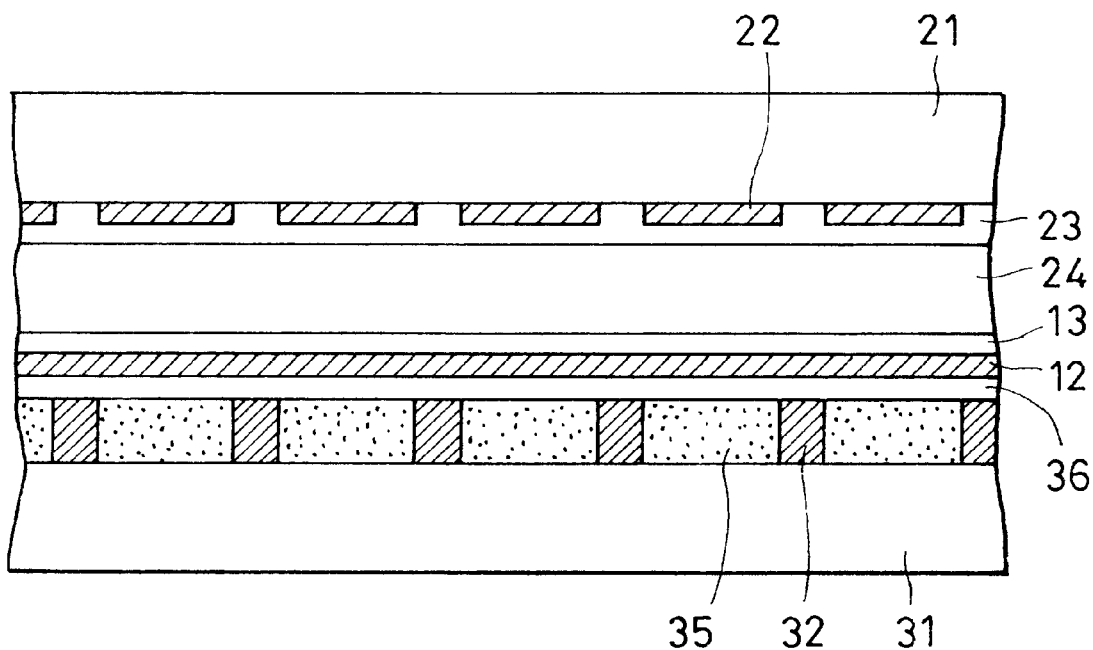
FIG. 4 is an illustrative cross section of one embodiment of a liquid crystal panel in which the color filter formed in FIGS. 3A through 3D is assembled.
Figure 5:
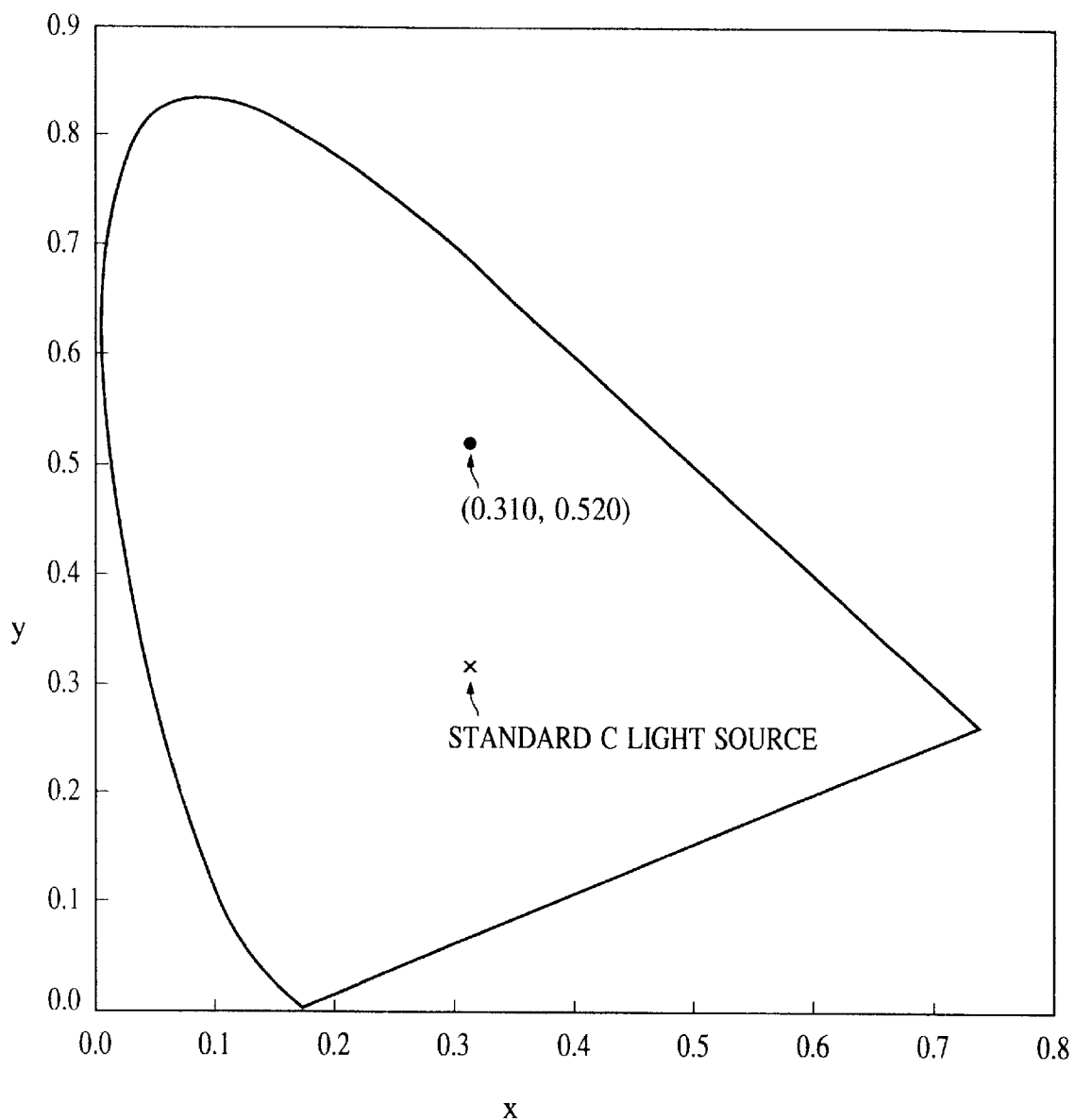
FIG. 5 is the CIE chromaticity diagram.
Figure 7:
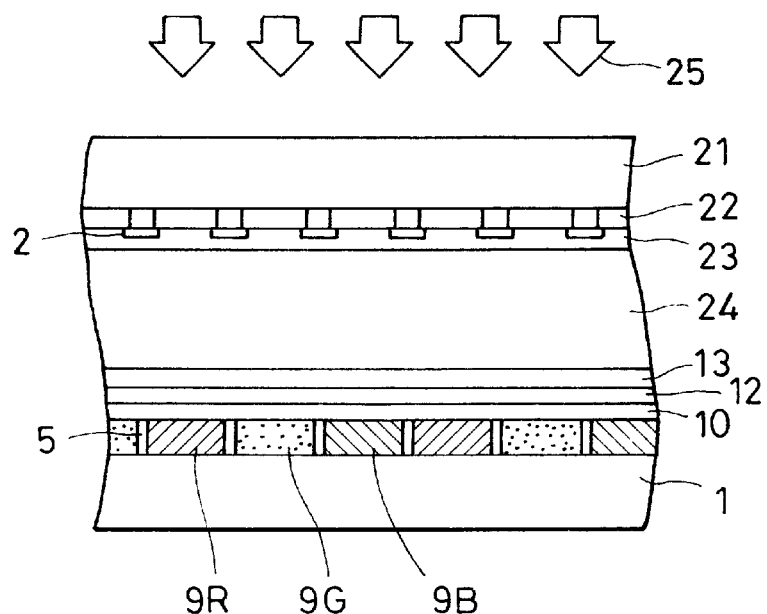
FIG. 7 is an illustrative cross section of a liquid crystal panel according to another embodiment of the present invention.

A liquid crystal panel can be also constructed using the color filter substrate formed in the foregoing embodiment by the same method as in the embodiment in FIG. 2. An illustrative cross section of such an embodiment of a liquid crystal panel is shown in FIG. 4. Liquid crystal panels having the constructions as shown in FIG. 7 and FIG. 8 may be constructed. In FIGS. 7 and 8, reference numerals 1, 2, 5, 10, 12, 13, 21, 22, 23, 24 and 25 are the same items as those in FIGS. 1, 2 and 4. In addition, reference numerals 9R, 9G and 9B denote red pixel, green pixel and blue pixel respectively. These liquid crystal panels may be used for the image display device 1003 of the computer 1001 shown in FIG. 9.

EXAMPLE 1

The green water soluble dye shown by the general formula (III) below is dissolved in a phosphate buffer solution comprising 60 mM/liter of $Na_2HPO_4.12H_2O$ and 16 mM/liter of $KH_2PO_4$ at pH 7.5, to prepare an aqueous solution with a concentration of 33 ppm. The chromaticity and stimulus value Y of this aqueous solution were measured according to JIS Z8701, obtaining the x-value and y-value in the CIE chromaticity diagram of (0.310, 0.520). This x-value is a value that is preferable for the green pixels of the color filter. Accordingly, the dye with the following general formula (III) is not required to be toned with the yellow dye. The stimulus value Y was 56 (see "Handbook of Science of Color", edited by Japanese Society of Science of Color).

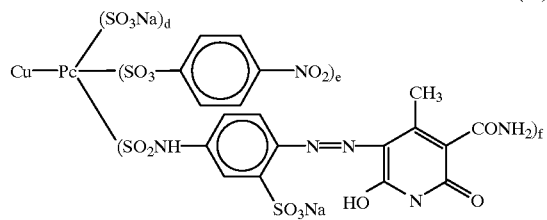
(III)

In formula (III), Cu—Pc denotes a copper-phthalocyanine frame; d=1 or 2; e=0, 1 or 2; f=1 or 2; and d+e+f≧4.

A phosphate buffer solution with a concentration of 33 ppm of the phthalocyanine dye represented by the following general formula (II) contained in the phthalocyanine dye represented by the foregoing general formula (I) was prepared and the x-value and y-value in the CIE chromaticity diagram were measured, obtaining the values of (0.24, 0.52). The stimulus value Y was 72.

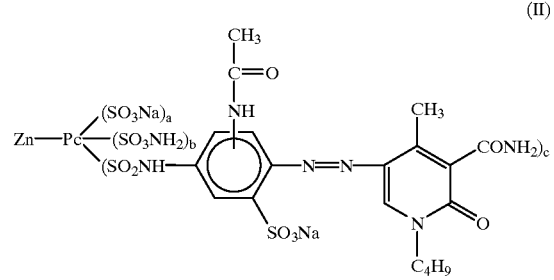
(II)

In formula (II), a=1 or 2; b=0, 1 or 2; c=1 or 2; and a+b+c≦4.

Figure 6:
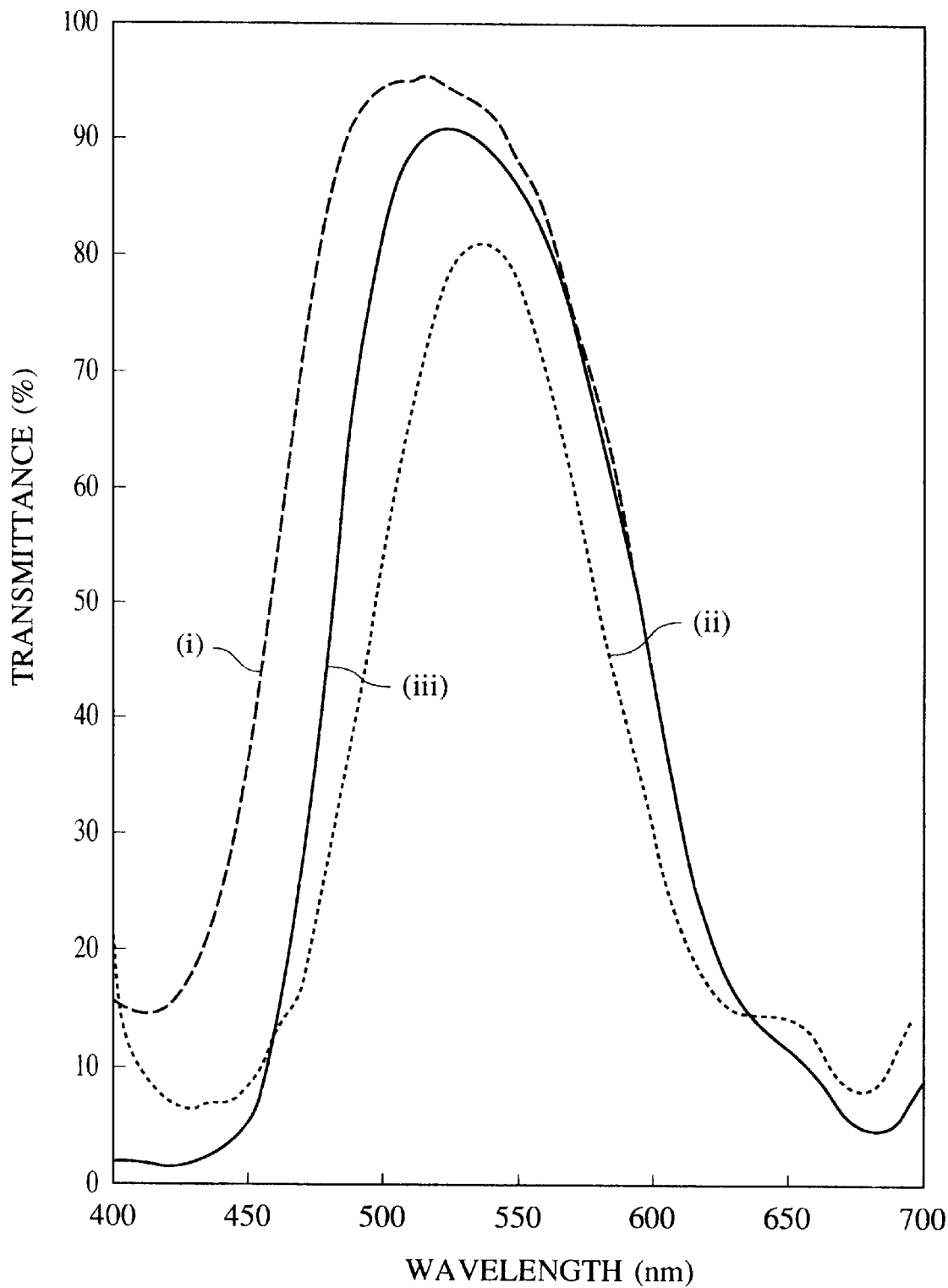
FIG. 6 shows transmittance spectra of each of the dye solutions in Example 1.

The transmittance spectra of the aqueous phosphate buffer solution of the compounds having the general formulae (II) and (III) described above were measured with a spectrophotometer (OSP-SP 200 made by Olympus Optics Co.). The results are shown in FIG. 6 as curves (i) and (ii), respectively. As is evident from FIG. 6, the aqueous solution of the phthalocyanine dye represented by general formula (II) allows permeation of a substantial amount of light having a wavelength of 450 nm or less.

Then, a 63.5 ppm phosphate buffer solution was prepared, in which the phthalocyanine dye with the general formula (II) above and a yellow water soluble dye with a transmittance at 530 nm of 95% and a transmittance at 450 nm of 0% were mixed in a mixing ratio of 2.6:2.4. The x- and y-values of this dye solution in the CIE chromaticity diagram were 0.310 and 0.520, respectively, while the Y stimulus value was 67. The transmittance spectrum of this aqueous solution is shown in FIG. 6 as curve (iii).

This result indicates that the mixed aqueous solution of the phthalocyanine dye represented by the foregoing general formula (II) and C.I. Acid Yellow 1 has a higher brightness by about 20% than the aqueous solution of the phthalocyanine dye represented by the foregoing general formula (III), irrespective of their having the same chromaticity. This result is also recognized by the fact that the transmittance peak of the spectral curve (iii) is higher than that of the spectral curve (ii) in the transmittance spectra shown in FIG. 6.

On the contrary, when two kinds of aqueous solutions are adjusted to have the same brightness (Y value), the y-value of the x- and y-values of the mixed aqueous solution of the dye represented by the foregoing formula (II) above and C.I. Acid Yellow 1 becomes larger, or the color reproducibility range becomes wider.

As shown in the mixed aqueous solution above, the ink for use in ink-jet recording according to the present invention has a higher brightness and wider color reproducibility range as compared with the case when conventional green coloring materials are used, thanks to subjecting the coloring material A having a specified chromaticity characteristic to toning with the coloring material B having a specified spectroscopic characteristic. However, this tendency can be reproduced as well when the color filter is formed by coloring the ink receptor layer and when the color filter is formed by directly allowing the curing type ink to be cured, making it possible to form a green filter having a high transmittance and wide color reproducibility.

EXAMPLE 2 AND COMPARATIVE EXAMPLE 1

A curing type resin composition as an ink receptor comprising a copolymer prepared by copolymerizing N-methylol acrylamide and hydroxyethyl methacrylate in a weight ratio of 5:5 was spin-coated on a glass substrate provided with a black matrix in which many openings with a dimension of 60×150 μm were aligned, followed by pre-baking at 90° C. for 20 minutes. Then, pixels of R, G and B were printed using an ink-jet printing head and red (R), green (G) and blue (B) inks. The printing conditions were: an ink-jet head with a mean ink quantity to be discharged by one discharge motion is 30 nanogram (ng) and the pitches among respective ink dots are adjusted to be 20 μm.

The ink receptor layer was then cured by baking the layer at 220° C. for 30 minutes. After drying, an acrylic heat-curing type resin of the two liquid type (trade name: SS-7625; made by Nihon Synthetic Rubber Co.) was spin-coated on the cured and dried ink receptor layer to a dry film thickness of 1.2 μm, followed by curing by a heat treatment at 230° C. for 50 minutes, thereby producing a color filter for use in the liquid crystal panel.

also measured likewise. The measuring wavelength was 380 to 780 nm (the transmittance was measured for every 5 nm), the light source was a C-light source and measurements were carried out with respect to a measuring spot diameter of 50 nm. The x- and y-values in the CIE chromaticity diagram were calculated using the stimulus values X and Z. The x- and y-values can be obtained as follows.

$$x\text{-value} = \frac{X}{X+Y+Z}$$

$$y\text{-value} = \frac{Y}{X+Y+Z}$$

(wherein X, Y and Z are stimulus values.)
The results are shown in TABLE 2.

TABLE 2

| | | Color material A | | Color material B | | | |
|---|---|---|---|---|---|---|---|
| | Name of dye | Content in ink (wt %) | x-value when y = 0.52 | Yellow dye in TABLE 1 | Content in ink (wt %) | Transmittance (%) at 530 nm | Transmittance (%) at 450 nm |
| Example 2-1 | Dye in the foregoing formula (II) | 2.6 | 0.240 | 1 | 2.4 | 95 | 0 |
| Example 2-2 | Dye in the following formula (IV) | 2.3 | 0.255 | 2 | 2.1 | 95 | 0 |
| Example 2-3 | Dye in the following formula (V) | 2.8 | 0.215 | 11 | 2.2 | 95 | 0 |
| Comparative Example 1 | Dye in the foregoing formula (III) | 4.1 | 0.310 | | not used | | |

Formulation of the inks (R ink)

Coloring material:

| C.I. Direct Red 80 | 4.5% by weight |
|---|---|
| Aqueous medium: | |
| Diethylene glycol | 20.0% by weight |
| Water | 75.5% by weight |

(G ink)

Coloring material:

| A combination of the blue dye and yellow dye shown in TABLE 2 | |
|---|---|
| Aqueous medium: | |
| Diethylene glycol | 20.0% by weight |
| Water | the balance |

(B ink)

Coloring material:

| A mixture of C.I. Acid Blue 7 and C.I. Acid Red 52 | 4.5% by weight |
|---|---|
| Aqueous medium: | |
| Diethylene glycol | 20.0% by weight |
| Water | 75.5% by weight |

Method of Evaluation
Evaluation 1: Measurement of the brightness Y value and x- and y-values The stimulus value (brightness) Y was measured by measuring the transmittance of the green filter obtained by using a microscopic spectrophotometer "OSP-SP200" made by Olympus Optics Co. The stimulus values X and Y were The dye of formula (IV) was used in Example 2-2:

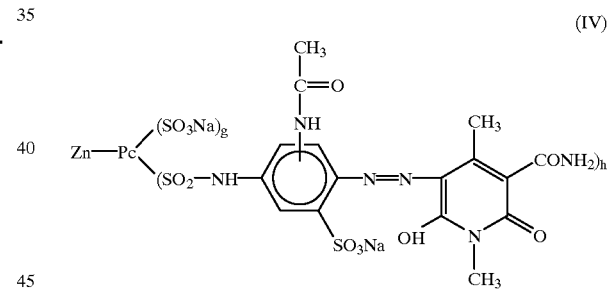

(IV)

Zn—Pc denotes a zinc-phthalocyanine frame; g is 1 or 2; h is 1 or 2 and g+h≦3.

The dye of formula (V) was used in Example 2-3:

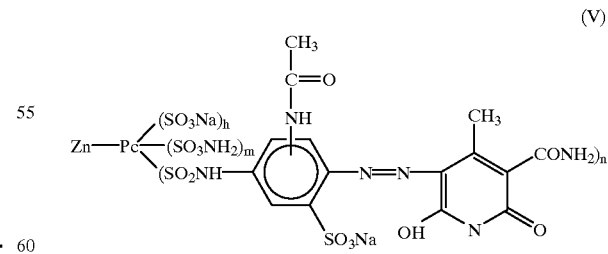

(V)

Zn—Pc denotes a zinc-phthalocyanine frame; h is 1 or 2; m is 0, 1 or 2; n is 1 or 2 and h+m+n≦4.

Evaluation 2: Functional evaluation of coloring nature of the green filter

Liquid crystal elements were produced using respective color filters prepared as described above to visually evaluate chromaticity by lighting only the green pixels. The results are listed in TABLE 3.

TABLE 3

| | x- and y-values of green pixel | Stimulus value (brightness) | Color of green filter |
|---|---|---|---|
| Example 2-1 | (0.32, 0.52) | 65 | Clear green color |
| Example 2-2 | (0.32, 0.52) | 63 | Clear green color |
| Example 2-3 | (0.32, 0.52) | 60 | Clear green color |
| Comparative Example 1 | (0.32, 0.52) | 52 | Green Color with low saturation (darker as compared to the filter in Examples 2-1 through 2-3) |

As previously described, a color filter provided with green pixels that are able to make color reproducibility and light permeability compatible with each other at a high level can be obtained in the present invention. The color filter also can be also produced with a low production cost.

According to the present invention, a color liquid crystal panel provided with superior color display characteristics can be obtained, making it possible to obtain a computer having an image display device with very good color display characteristics.

While the present invention has been described with reference to what are presently considered to be the preferred embodiments, it is to be understood that the invention is not limited to the disclosed embodiments. To the contrary, the invention is intended to cover various modifications and equivalent arrangements, included within the spirit and scope of the appended claims. The scope of the following claims is to be accorded the broadest interpretation so as to encompass all such modifications and equivalent structures and functions.

What is claimed is:

1. An ink-jet recording ink comprising:

an aqueous medium,
   a water soluble dye A having CIE chromaticity wherein x-chromaticity is 0.190 to 0.280 when y-chromaticity is 0.520 in a phosphate buffer solution comprising 60 mM/liter of $Na_2HPO_4 \cdot 12H_2O$ and 16 mM/liter of $KH_2PO_4$ at pH 7.5; and
   a water soluble dye B having 95% or more transmittance of light having a wavelength of 530 nm and 50% or less transmittance of light having a wavelength of 450 nm in a phosphate buffer solution comprising 60 mM/liter of $Na_2HPO_4 \cdot 12H_2O$ and 16 mM/liter of $KH_2PO_4$ at pH 7.5.

2. An ink according to claim 1, wherein said water soluble dye A has a stimulus value Y of 45 or more.

3. An ink according to claim 1, further comprising a curable resin.

4. An ink according to claim 1, wherein said water soluble dye A contains a phthalocyanine dye represented by the following general formula (I)

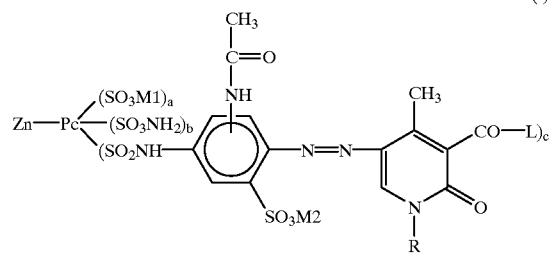

wherein Zn—Pc represents a zinc phthalocyanine frame; R represents a linear or branched alkyl group with 1 to 6 carbons; L represents OH or $NH_2$; M1 and M2 independently represent a mono-valent alkali metal; a=1 or 2; b=0, 1 or 2; c=1 or 2 and a+b+c≦4.

5. An ink according to claim 4, wherein said water soluble dye A contains a phthalocyanine dye represented by the following general formula (II):

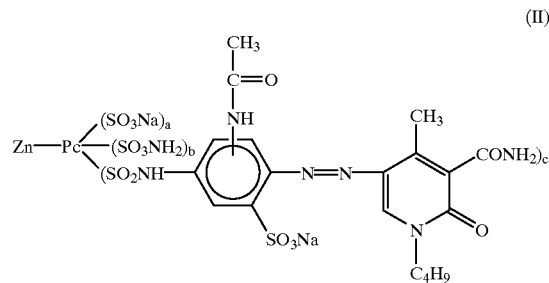

wherein Zn—Pc represents a zinc phthalocyanine frame; a=1 or 2; b=0, 1 or 2; c=1 or 2 and a+b+c≦4.

6. An ink according to claim 1, wherein said water soluble dye B is at least one of the dyes selected from the group consisting of C.I. Acid Yellow 1, C.I. Acid Yellow 11, C.I. Acid Yellow 17, C.I. Acid Yellow 19, C.I. Acid Yellow 23, C.I. Acid Yellow 44, C.I. Acid Yellow 104, C.I. Acid Yellow 110, C.I. Acid Yellow 127, C.I. Acid Yellow 141, C.I. Acid Yellow 169, C.I. Acid Yellow 176, C.I. Acid Yellow 184, C.I. Acid Yellow 235, C.I. Acid Yellow 246, C.I. Direct Yellow 9, C.I. Direct Yellow 10, C.I. Direct Yellow 12, C.I. Direct Yellow 39, C.I. Direct Yellow 50, C.I. Direct Yellow 58, C.I. Direct Yellow 84, C.I. Direct Yellow 87, C.I. Direct Yellow 90, C.I. Direct Yellow 98, C.I. Direct Yellow 137, C.I. Direct Yellow 144, C.I. Direct Yellow 147, C.I. Reactive Yellow 1, C.I. Reactive Yellow 2, C.I. Reactive Yellow 18, C.I. Reactive Yellow 49, C.I. Reactive Yellow 79, C.I. Reactive Yellow 81, C.I. Reactive Yellow 99, C.I. Reactive Yellow 135 and C.I. Reactive Yellow 220.

7. An ink according to claim 1 containing said water soluble dyes A and B at a weight ratio in a range of 5:5 to 8:2.

8. A color filter comprising green pixels on a transparent substrate, wherein said green pixels comprise:

a water soluble dye A having CIE chromaticity wherein x-chromaticity is 0.190 to 0.280 when y-chromaticity is 0.520 in a phosphate buffer solution comprising 60 mM/liter of $Na_2HPO_4 \cdot 12H_2O$ and 16 mM/liter of $KH_2PO_4$ at pH 7.5; and
   a water soluble dye B having 95% or more transmittance of light having a wavelength of 530 nm and 50% or less transmittance of light having a wavelength of 450 nm in a phosphate buffer solution comprising 60 mM/liter of $Na_2HPO_4 \cdot 12H_2O$ and 16 mM/liter of $KH_2PO_4$ at pH 7.5.

9. A color filter according to claim 8, wherein said water soluble dye A has a stimulus value Y of 45 or more.

10. A color filter according to claim 8, wherein said water soluble dye A contains a phthalocyanine dye represented by the following general formula (I):

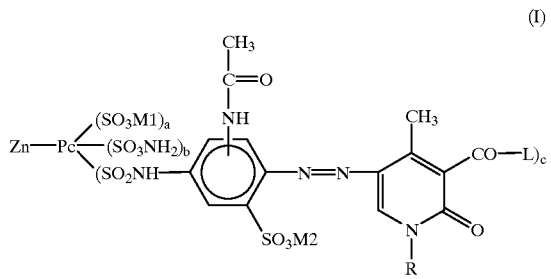

wherein Zn—Pc represents a zinc phthalocyanine frame; R represents a linear or branched alkyl group with 1 to 6 carbons; L represents OH or $NH_2$; M1 and M2 independently represent a mono-valent alkalinmetal; a=1 or 2; b=0, 1 or 2; c=1 or 2 and a+b+c$\leq$4.

11. A color filter according to claim 10, wherein said water soluble dye A contains a phthalocyanine dye represented by the following general formula (II):

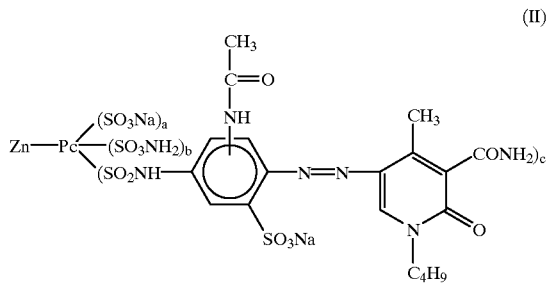

wherein Zn—Pc represents a zinc phthalocyanine frame; a=1 or 2; b=0, 1 or 2; c=1 or 2 and a+b+c$\leq$4.

12. A color filter according to claim 8, wherein said water soluble dye B is at least one of the dyes selected from the group consisting of C.I. Acid Yellow 1, C.I. Acid Yellow 11, C.I. Acid Yellow 17, C.I. Acid Yellow 19, C.I. Acid Yellow 23, C.I. Acid Yellow 44, C.I. Acid Yellow 104, C.I. Acid Yellow 110, C.I. Acid Yellow 127, C.I. Acid Yellow 141, C.I. Acid Yellow 169, C.I. Acid Yellow 176, C.I. Acid Yellow 184, C.I. Acid Yellow 235, C.I. Acid Yellow 246, C.I. Direct Yellow 9, C.I. Direct Yellow 10, C.I. Direct Yellow 12, C.I. Direct Yellow 39, C.I. Direct Yellow 50, C.I. Direct Yellow 58, C.I. Direct Yellow 84, C.I. Direct Yellow 87, C.I. Direct Yellow 90, C.I. Direct Yellow 98, C.I. Direct Yellow 137, C.D. Direct Yellow 144, C.I. Direct Yellow 147, C.I. Reactive Yellow 1, C.I. Reactive Yellow 2, C.I. Reactive Yellow 18, C.I. Reactive Yellow 49, C.I. Reactive Yellow 79, C.I. Reactive Yellow 81, C.I. Reactive Yellow 99, C.I. Reactive Yellow 135 and C.I. Reactive Yellow 220.

13. A color filter according to claim 8, containing said water soluble dyes A and B at a weight ratio in a range of 5:5 to 8:2.

14. A color filter according to claim 8, wherein said transparent substrate comprises a surface, said substrate has a resin layer on said surface, and part of said resin layer comprises said green pixels.

15. A color filter according to claim 8, wherein said color filter further comprises red pixels and blue pixels forming respective patterns.

16. A color filter according to claim 15, wherein said green, red and blue pixels adjoin each other, said adjoining pixels are disposed in a spaced relation to each other and the filter comprises a light shielding layer between said adjoining colored pixels.

17. A color filter according to claim 16, wherein said light shielding layer has a surface that repels ink.

18. A liquid crystal panel comprising a color filter according to any one of claims 8 to 17, a transparent substrate disposed opposite said color filter, and a liquid crystal compound sealed between said color filter and said transparent substrate.

19. A computer comprising a display device comprising the liquid crystal panel according to claim 18.

20. A method for producing a color filter comprising green pixels comprising the steps of:

ejecting an ink according to any one of claims 1 to 7 onto a transparent substrate comprising a surface, using an ink-jet method; and adhering the ink to a desired position on said surface of said substrate to form the pixels.

21. A method for producing a color filter according to claim 20, wherein said transparent substrate has a resin layer on said surface.

22. A method for producing a color filter according to claim 21, wherein said resin layer contains a polymer containing at least a water soluble acrylic monomer unit.

23. A method for producing a color filter according to claim 21, wherein said resin layer comprises a water soluble polymer selected from the group consisting of carboxymethyl cellulose, hydroxyethyl cellulose and hydroxypropyl cellulose.

24. A method for producing a color filter comprising green pixels comprising the steps of:

ejecting the ink according to claim 3 onto a transparent substrate comprising a surface, using an ink-jet method;

adhering the ink to a desired position on said surface of said substrate; and curing the curable resin in said ink to form the pixels.

25. A method for producing a color filter according to claim 20, wherein said transparent substrate has adjoining pixels thereon and comprises light shielding layers disposing said adjoining pixels in a spaced relation to each other.

26. A method for producing a color filter according to claim 24, wherein said transparent substrate has adjoining pixels thereon and comprises light shielding layers disposing said adjoining pixels in a spaced relation to each other.

27. A method for producing a color filter according to claim 25, wherein said light shielding layers have surfaces and an ink repelling resin layer on said surfaces.

28. A method for producing a color filter according to claim 26, wherein said light shielding layers have surfaces and an ink repelling resin layer on said surfaces.

29. A method for producing a color filter according to claim 20 further comprising the steps of forming a curable resin layer covering said pixels; and curing said curable resin layer.

30. A method for producing a color filter according to claim 24 further comprising the steps of forming a curable resin layer covering said pixels; and curing said curable resin layer.

31. A method for producing a color filter according to claim 29, wherein said curable resin layer is cured by at least one of light, heat, and a combination of light and heat.

32. A method for producing a color filter according to claim 30, wherein said curable resin layer is cured by at least one of light, heat, and a combination of light and heat.

* * * * *

UNITED STATES PATENT AND TRADEMARK OFFICE
CERTIFICATE OF CORRECTION

PATENT NO. : 6,063,174

DATED : May 16, 2000

INVENTOR(S) : KATSUHIRO SHIROTA, ET AL.        Page 1 of 4

It is certified that error appears in the above-identified patent and that said Letters Patent is hereby corrected as shown below:

ON THE COVER PAGE:

Item [57] ABSTRACT

Line 10, "$Na_2HPO_4.12H_2O$" should read --$Na_2HPO_4 \cdot 12H_2O$--.
    Line 15, "$Na_2HPO_4.12H_2O$" should read --$Na_2HPO_4 \cdot 12H_2O$--.

IN THE DISCLOSURE:

COLUMN 1:

Line 53, "a electrodeposition" should read --an electrodeposition--.

COLUMN 2:

Line 19, "dying" should read --dyeing--.
    Line 23, "satisfies with" should read --satisfy--.
    Line 43, "is an" should read --is--.

COLUMN 3:

Line 2, "forgoing" should read --foregoing--.
    Line 66, "$Na_2HPO_4.12H_2O$" should read --$Na_2HPO_4 \cdot 12H_2O$--.

UNITED STATES PATENT AND TRADEMARK OFFICE
CERTIFICATE OF CORRECTION

PATENT NO.   :  6,063,174
DATED        :  May 16, 2000
INVENTOR(S)  :  KATSUHIRO SHIROTA, ET AL.

It is certified that error appears in the above-identified patent and that said Letters Patent is hereby corrected as shown below:

COLUMN 4:

Line 5, "$Na_2HPO_4.12H_2O$" should read --$Na_2HPO_4·12H_2O$--.
Line 15, "$Na_2HPO_4.12H_2O$" should read --$Na_2HPO_4·12H_2O$--.
Line 21, "$Na_2HPO_4.12H_2O$" should read --$Na_2HPO_4·12H_2O$--.
Line 34, "$Na_2HPO_4.12H_2O$" should read --$Na_2HPO_4·12H_2O$--.
Line 40, "$Na_2HPO_4.12H_2O$" should read --$Na_2HPO_4·12H_2O$--.
Line 53, "$Na_2HPO_4.12H_2O$" should read --$Na_2HPO_4·12H_2O$--.
Line 59, "$Na_2HPO_4.12H_2O$" should read --$Na_2HPO_4·12H_2O$--.

COLUMN 5:

Line 2, "a ink-jet" should read --an ink-jet--.
Line 7, "$Na_2HPO_4.12H_2O$" should read --$Na_2HPO_4·12H_2O$--.
Line 13, "$Na_2HPO_4.12H_2O$" should read --$Na_2HPO_4·12H_2O$--.
Line 27, "$Na_2HPO_4.12H_2O$" should read --$Na_2HPO_4·12H_2O$--.
Line 33, "$Na_2HPO_4.12H_2O$" should read --$Na_2HPO_4·12H_2O$--.
Line 62, "the yet" should read --yet--.

COLUMN 6:

Line 11, "$Na_2HPO_4.12H_2O$" should read --$Na_2HPO_4·12H_2O$--.
Line 17, "$Na_2HPO_4.12H_2O$" should read --$Na_2HPO_4·12H_2O$--.
Line 46, "$Na_2HPO_4.12H_2O$" should read --$Na_2HPO_4·12H_2O$--.

UNITED STATES PATENT AND TRADEMARK OFFICE
CERTIFICATE OF CORRECTION

PATENT NO. : 6,063,174

DATED : May 16, 2000

INVENTOR(S) : KATSUHIRO SHIROTA, ET AL.

It is certified that error appears in the above-identified patent and that said Letters Patent is hereby corrected as shown below:

COLUMN 9:

Line 31, "$R_1,$" should read --$R_1$--.

COLUMN 12:

Line 21, "the another" should read --another--.

COLUMN 13:

Line 36, "$Na_2HPO_4.12H_2O$" should read --$Na_2HPO_4 \cdot 12H_2O$--.
    Line 60, "$d+e+f \geq 4.$" should read --$d+e+f \leq 4.$--.

COLUMN 17:

Line 21, "be also" should read --be--.
    Line 52, "$Na_2HPO_4.12H_2O$" should read --$Na_2HPO_4 \cdot 12H_2O$--.
    Line 58, "$Na_2HPO_4.12H_2O$" should read --$Na_2HPO_4 \cdot 12H_2O$--.

COLUMN 18:

Line 60, "$Na_2HPO_4.12H_2O$" should read --$Na_2HPO_4 \cdot 12H_2O$--.
    Line 66, "$Na_2HPO_4.12H_2O$" should read --$Na_2HPO_4 \cdot 12H_2O$--.

UNITED STATES PATENT AND TRADEMARK OFFICE
CERTIFICATE OF CORRECTION

PATENT NO. : 6,063,174

DATED : May 16, 2000

INVENTOR(S) : KATSUHIRO SHIROTA, ET AL.   Page 4 of 4

It is certified that error appears in the above-identified patent and that said Letters Patent is hereby corrected as shown below:

<u>COLUMN 19</u>:

```
     Line 21, "alkalinmetal;" should read
--alkali metal;--.
```

Signed and Sealed this

Twenty-second Day of May, 2001

*Attest:*

NICHOLAS P. GODICI

*Attesting Officer*   *Acting Director of the United States Patent and Trademark Office*